US011353848B1

(12) United States Patent
Madden (10) Patent No.: US 11,353,848 B1
(45) Date of Patent: Jun. 7, 2022

(54) VIDEO CONTROLLED ADJUSTMENT OF LIGHT CONDITIONS AT A PROPERTY

(71) Applicant: ObjectVideo Labs, LLC, Tysons, VA (US)

(72) Inventor: Donald Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/518,581

(22) Filed: Jul. 22, 2019

Related U.S. Application Data

(60) Provisional application No. 62/711,783, filed on Jul. 30, 2018.

(51) Int. Cl.
*G05B 19/4155* (2006.01)
*G06T 7/70* (2017.01)

(52) U.S. Cl.
CPC ............ *G05B 19/4155* (2013.01); *G06T 7/70* (2017.01); *G05B 2219/45242* (2013.01); *G06T 2207/10016* (2013.01); *G06T 2207/30196* (2013.01); *G06T 2207/30232* (2013.01)

(58) Field of Classification Search
CPC ...... G05B 19/4155; G05B 2219/45242; G06T 7/70; G06T 2207/10016; G06T 2207/30196; G06T 2207/30232
See application file for complete search history.

(56) References Cited

U.S. PATENT DOCUMENTS

| | | | |
|---|---|---|---|
| 2014/0063237 A1* | 3/2014 | Stone | H04N 7/181 348/143 |
| 2016/0054023 A1* | 2/2016 | Baker | H05B 47/115 307/31 |
| 2016/0322817 A1* | 11/2016 | Baker | G05B 15/02 |
| 2018/0187484 A1* | 7/2018 | Hebeisen | F24F 11/30 |
| 2018/0374276 A1* | 12/2018 | Powers | G06T 19/20 |
| 2019/0384232 A1* | 12/2019 | Casey | G06T 7/0002 |
| 2020/0001687 A1* | 1/2020 | Chow | B60J 3/0204 |

* cited by examiner

*Primary Examiner* — Chad G Erdman
(74) *Attorney, Agent, or Firm* — Fish & Richardson P.C.

(57) ABSTRACT

Methods, systems, and apparatus, including computer programs encoded on a computer storage medium, for implementing video controlled adjustment of light conditions at a property. A monitoring system obtains video data from a video recording device at the property and uses the video data to determine a location of a person at the property as well as a location of an electronic window treatment at the property. Using the video data, the system identifies an attribute of light entering a window at the property. The system determines an adjustment setting for the electronic window treatment at the property based on the attribute of the light and the location of the person at the property. Based on the adjustment setting, a command is provided to perform a first adjustment action that adjusts the position of the electronic window treatment located at the window.

21 Claims, 3 Drawing Sheets

VIDEO CONTROLLED ADJUSTMENT OF LIGHT CONDITIONS AT A PROPERTY

CROSS-REFERENCE TO RELATED APPLICATIONS

This application claims priority under 35 USC § 119(e) to U.S. Patent Application Ser. No. 62/711,783, filed on Jul. 30, 2018, the contents of which are incorporated by reference in their entirety.

FIELD

This specification relates to devices for monitoring and controlling items at a property.

BACKGROUND

Monitoring devices are often dispersed at various locations at a property such as a home or commercial business. The devices can have distinct functions at different locations of the property. Some devices at a property offer monitoring and control functionality that can be leveraged to control light conditions affecting certain sections or areas of the property.

SUMMARY

Methods, systems, and apparatus, including computer programs encoded on a computer storage medium, for obtaining video data from a video recording device at a property to reduce the brightness or glare of light entering the room, e.g., to improve a person's ability to identify and distinguish various items located at the property, or simply for occupant comfort. A property monitoring system determines the location of the person and the location of an electronic window treatment using the video data obtained by the video recording device. The system uses the video data to identify an attribute of light entering a window at the property. For example, an attribute of light may be brightness that has an adverse effect on the person's ability to clearly identify items located at the property.

Based on the attribute of the light and the location of the person at the property, the system determines an adjustment setting for the electronic window treatment. The system provides a command to perform a first adjustment action based on the adjustment setting. The first adjustment action adjusts the electronic window treatment located at the window. The window treatment can be adjusted to reduce the brightness or glare of light entering the room and improve the person's ability to identify and distinguish various items located at the property.

The subject matter described in this document can be embodied in a method implemented using a monitoring system that is configured to monitor a property. The method includes obtaining video data from a video recording device at the property; determining, using the video data, a location of a person at the property and a location of an electronic window treatment that is installed adjacent a window at the property; and identifying, using the video data, an attribute of light entering the window. The method includes determining, based on the attribute of the light and the location of the person at the property, an adjustment setting for the electronic window treatment. The electronic window treatment includes a controller that is operable to adjust the electronic window treatment to control an amount of light in an area of the property. The method further includes providing, based on the adjustment setting, a command to perform a first adjustment action that adjusts a position of the electronic window treatment installed adjacent the window.

These and other implementations can each optionally include one or more of the following features. For example, in some implementations, the method further includes adjusting, based on the command, the electronic window treatment to control the amount of light in the area of the property. In some implementations, identifying the attribute of the light includes determining an intensity value of the attribute of the light entering the window at the property and determining a glare value of the attribute of the light entering the window at the property. In some implementations, the method includes determining the adjustment setting for the electronic window treatment in response to determining that the intensity value of the attribute of the light exceeds a threshold intensity value.

In some implementations, the method includes determining the adjustment setting for the electronic window treatment in response to determining that the glare value of the attribute of the light exceeds a threshold glare value. In some implementations, determining the adjustment setting includes determining that the person is within a threshold distance of the window and the electronic window treatment; and determining the adjustment setting when the person is within the threshold distance of the window or the electronic window treatment.

In some implementations, the method includes determining that the person is within a threshold distance of the window such that an intensity of the attribute of light entering the window affects the person's ability to identify an object at the property; and adjusting the electronic window treatment to control the amount of light in the area of the property to reduce the intensity of the attribute of light entering the window.

In some implementations, determining the adjustment setting includes identifying, based on the video data, a first area at the property and a characteristic of the first area; determining that the electronic window treatment is located at a particular section of the first area at the property; and determining the adjustment setting based on the characteristic of the first area and the electronic window treatment being located at the particular section of the first area.

In some implementations, the method includes determining a plurality of light conditions at the property based on a visual data model of the area of the property. In some implementations, the method includes receiving, by a transceiver of the controller, a wireless signal for actuating motorized controls of the controller; and actuating, using the wireless signals, the motorized controls to adjust the electronic window treatment and control the amount of light in the area of the property based the plurality of light conditions.

In some implementations, determining the plurality of light conditions comprises: monitoring imagery data of the visual data model to detect when patches of pixels in the imagery data increase and decrease in brightness throughout a given day; and determining the plurality of light conditions based on the relative increase and decrease in the brightness of the patches of pixels in the imagery data.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

Like reference numbers and designations in the various drawings indicate like elements.

DETAILED DESCRIPTION

A property, such as a house or a place of business, can be equipped with a monitoring system to enhance the security of the property. The property monitoring system may include one or more sensors, such as cameras, motion detectors, or temperature sensors distributed about the property to monitor conditions at the property. In many cases, the property monitoring system also includes one or more controls, which enable automation of various property actions, such as locking/unlocking a door, adjusting lighting conditions, or detecting motion at the property. The property monitoring system can also include a control unit, a window treatment controller, and a video recording device (e.g., a digital camera/video recorder) that are each configured to provide information to a monitoring server of the system. The monitoring server can use the information to adjust light conditions in an area of the property.

In this context, techniques are described for automated video-based control of window treatment, such as window shades, blinds, draperies, curtains, or other similar items that can affect light conditions at a property. The controls allow for opening and closing shades at the property, either locally or remotely via a computer network or application program (an "app") installed on a mobile device. Control can be based on a schedule or can occur automatically in response to sensing or detecting glare at an area of the property or in response to sensing/detecting a certain intensity of light at the area. In some implementations, the controls can include more fine-grained automation functions when integrated with a video-analytics enabled home security and automation system. The controls can also provide automation that matches (e.g., substantially matches) a user's desired level of light control for certain areas of the property.

As described in more detail below, the described techniques can be used to integrate video-analytics and dynamic window treatment controls within a property monitoring system to enhance existing controls for managing light conditions at the property. The improved controls enable a property owner to dynamically and automatically adjust a shade or blind's position in response to video-based detection of excessive glare in a room or area at the property. Hence, window treatment adjustment and light control features provided by the property monitoring system can be enhanced or improved relative to other monitoring systems based on the described teachings.

Figure 1:
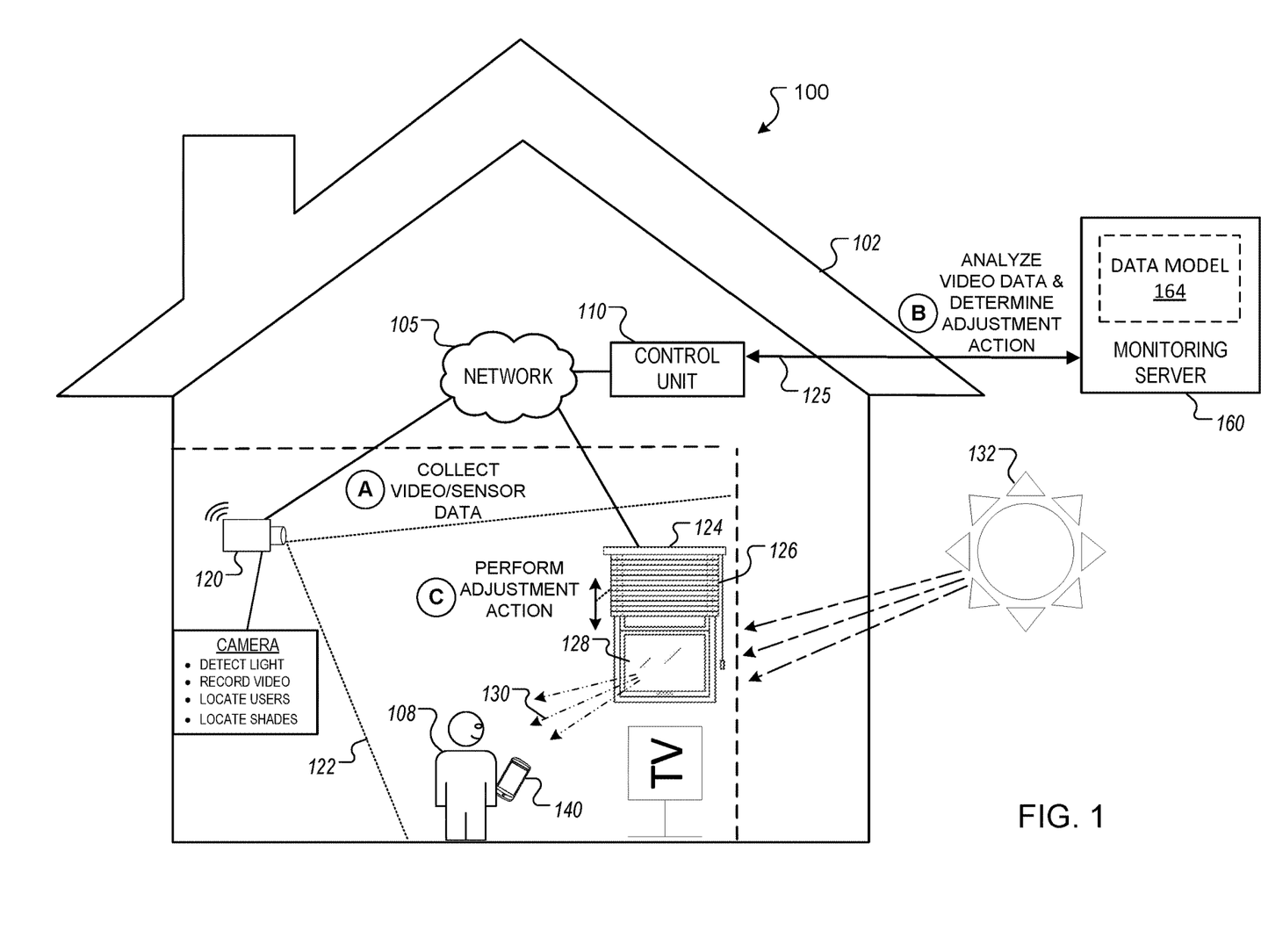
FIG. 1 shows a block diagram of an example system for controlling window treatment at a property.

FIG. 1 shows a block diagram of an example computing system 100 for controlling window treatment at a property. The system 100 can include a video recording device 120, a controller 124, and multiple other devices that are located at a property 102 monitored by a property monitoring system. The property 102 may be, for example, a residence, such as a single family home, a townhouse, a condominium, or an apartment. In some examples, the property 102 may be a commercial property, a place of business, or a public property.

The property monitoring system includes a control unit 110 at the property 102 that sends video data 125 obtained using video recorder 120 to a remote monitoring server 160. Video recorder 120 can be an electronic device configured to obtain video or image data of various rooms and sections of property 102. For example, video recorder 120 can be a camera (e.g., a digital camera) that captures video or still images within a viewable area 122 of the property 102. Controller 124 can be a device that controls a movement or position of a window treatment 126 installed at a window 128 of the property 102. In some implementations, system 100 is a sub-system of the property monitoring system.

The window treatment 126 can be window shades, blinds, draperies, curtains, or other similar items that can be used to control or restrict an amount of light that enters a room or area 122 at the property 102 via window 128. The controller 124 can include motorized controls as well as one or more sensors, such as a transceiver or a discrete receiver and transmitter pair. The motorized controls can be configured to actuate in response to control signals (e.g., a wireless signal or radio signal) received by the one or more sensors. For example, the sensors can receive, via network 105, a wireless signal that causes the motorized controls to actuate and perform an adjustment action. The adjustment action can include moving or re-positioning window treatment 126 relative to window 128.

In addition to detecting and processing wireless signals received via network 105, sensors of the controller 124 can also transmit wireless signals that indicate a current position of the window treatment 126 at the property 102. In some implementations, the sensors may include, for example, various types of signal processing sensors or related wireless window treatment sensors that detect radio signals for opening and closing shades or blinds of a window. The monitoring server 160 receives and analyzes the video data and position data encoded in wireless signals transmitted by sensors of the controller 124. The monitoring server 160 performs various functions for controlling light conditions in an area 122 at the property 102 based on the video data and position data encoded in the wireless signal.

Control unit 110 is located at the property 102 and may be a computer system or other electronic device configured to communicate with the sensors of controller 124 to cause various functions to be performed for the property monitoring system or system 100. The control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded or dedicated hardware. The control unit 110 may include software, which configures the unit to perform the functions described in this disclosure. In some implementations, the property owner or a resident (a person 108) of the property 102 communicates with the control unit 110 through a physical connection (e.g., touch screen, keypad, etc.) and/or network connection. In some implementations, the property owner or resident communicates with the control unit 110 through a software ("smart home") application installed on their mobile device 140.

The video recorder 120 and controller 124 communicate with the control unit 110, for example, through a network 105. The network 105 may be any communication infrastructure that supports the electronic exchange of data 125 between the control unit 110, the video recorder 120, and the controller 124. The network 105 may include a local area network (LAN), a wide area network (WAN), the Internet, or other network topology. The network 105 may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, the network 105 may include optical data links. To support communications through the network 105, one or more devices of the monitoring system may include communications modules, such as a modem, transceiver, modulator, or other hardware or software configured to enable the device to communicate electronic data through the network 105.

The video recorder 120 sends various sensor/video data 125 to the control unit 110. For example, the video recorder 120 can send image or video data 125 from one or more camera sensors, motion sensing data 125 from one or more motion detectors, or other sensor or video data 125 related to a location of a person 108, window treatment 126, or other items at the property 102. The video data 125 transmitted by the video recorder 120 can be encoded in radio signals transmitted by the sensing components of the video recorder 120. The control unit 110 can also communicate with one or more home automation controls of the property 102 to control the operation of home automation devices at the property. For example, control unit 110 can manage operation of one or more of a thermostat, a humidifier, door locks, interior or exterior lights, as well as operation of the video recorder 120 and controller 124.

In some implementations, the control unit 110 performs various operations related to the property 102 by sending commands to one or more of the video recorder 120 and the controller 124. For example, the control unit 110 can change a thermostat setting, lock or unlock a door, open or close a garage door, or power on or off a light of the property 102 by sending a command to a particular device or sensor at the property 102. As described in more detail below, the control unit 110 can change or adjust a position of the window treatment 126 by sending a command (e.g., an adjustment command) to controller 124.

In some implementations, the control unit 110 also communicates with an authorized user mobile device 140, possibly through the network 105. The user mobile device 140 may be associated with a person 108, such as property owner or a resident of the property 102 and may be, for example, a portable personal computing device, such as a cellphone, a smartphone, a tablet, a mobile device, or other electronic device. In some examples, the user mobile device 140 is an electronic home assistant or a smart speaker. The system 100 interacts with a monitoring server 160, which may be remote from the property 102. The monitoring server 160 can be, for example, one or more computer systems, server systems, or other computing devices. In some implementations, the monitoring server 160 is a cloud computing platform.

The control unit 110 communicates with the remote monitoring server 160 via a long-range data link. The long-range data link can include any combination of wired and wireless data networks. For example, the control unit 110 may exchange information with the monitoring server 160 through a wide-area-network (WAN), a cellular telephony network, a cable connection, a digital subscriber line (DSL), a satellite connection, or other electronic means for data transmission. The control unit 110 and the monitoring server 160 may exchange information using any one or more of various communication synchronous or asynchronous protocols, including the 802.11 family of protocols, GSM, 3G, 4G, 5G, LTE, CDMA-based data exchange or other techniques.

Monitoring server 160 can include a data model 164 that is generated based on sensor data 125. Data model 164 can be a multi-dimensional model (e.g., 2D or 3D model) of a room or area 122 at the property 102. In some implementations, monitoring server 160 is configured to detect or identify light 130 (e.g., from sun 132) based on analysis of the received sensor/video data 125. The monitoring server 160 determines light conditions at the property 102 using the detected light 130 and generates a floorplan of at least area 122 based on the detected light conditions. The floor plan can include positions or locations of walls, doors, and windows 128 at the property 102. For example, the monitoring server 160 can detect, identify, or otherwise infer one or more infrared ground planes at the property based on the various light conditions at the property. In some implementations, the monitoring server 160 generates the data model 164 (e.g., 3D model of a room) using the infrared ground planes that are inferred from the light conditions.

The monitoring server 160 can also use computing logic for video analytics to build a visual data model 164 of a room or area 122 at property 102. The visual data model 164 can include imagery data that is monitored to detect when patches of pixels in the imagery data increase in brightness throughout the day. In some implementations, a time of day and local weather conditions may be used to increase the accuracy of this visual data model 164. For example, if a bright patch of pixels reverts to the same luminance value as the surrounding area during cloudy weather conditions, the system can determine that such luminance values are likely a result of light projections at window 128.

In some implementations, data model 164 is configured to infer a plane of a floor of the property 102, e.g., over time based on where people are observed walking by video recorder 120. The system might also infer a geometry of other surfaces like a desk or wall by observing, using video recorder 120, how sunlight moves across the surface of these items and referencing data about the movement of the sun 132 based on a geographic location of the video scene or property 102. For example, the monitoring server 160 can bootstrap by using scene segmentation, basic camera calibration, or an estimated location and pitch of the ground plane (e.g., the floor) in a field of view of video recorder 120. The estimate can be refined by observing people walking through the scene, e.g., as their feet traverse the plane of the floor. The system can use an apparent height of the people at different points in the scene to determine an estimate of at least one angle of the plane with respect to video recorder 120.

Using the data for the apparent height, the system can estimate how a patch of light 130 shining through a window 128 in a given location would project onto the floor, given the position of the sun 132 in the sky. If the patch of light is determined to deviate from a particular location, then the system can adjust the geometric data model 164 of the room to account for walls and surfaces at different heights. Over time, the system monitors the light conditions of an area 122 and learns how the light 130 that ultimately interacts with the floor, wall, or other surface of area 122 will project onto a person (e.g., project onto the person's head) who is standing or sitting in a given location. Based on these learned observations, the system can adjust window treatment 126 to ensure a certain amount of light 130 does not project onto a person's face or head when the person is present at area 122.

Initialization of this visual data model 164 can include an automatic calibration phase where all window treatment 126 (e.g., shades or blinds) are closed and then opened during a predefined time period. This automatic calibration phase can be used to create a spatial mapping of a position of each window treatment 126 to an affected area shown in the video recording. In some implementations, additional information such as a geospatial location of the property 102, time and date, and weather forecasts are used to infer a relative position of the sun 132. This information can be used to create a geometric data model 164 that indicates how light conditions for these affected areas at property 102 will shift throughout the day and year. In some implementations, the geometric data model is iteratively updated over multiple observations each time window treatment 126 is adjusted, or as a position of sun 132 relative to property 102 changes throughout the day or even throughout the year as the sun's 132 angle shifts.

The monitoring server 160 can use the data model 164 to iteratively tune adjustment settings for adjusting window treatment 126. Parameters of the data model 164 that correspond to adjustment settings of the window treatment 126 can be iteratively tuned over time to predict or determine optimal adjustment settings for adjusting window treatment 126. In some implementations, the parameters are tuned to determine optimal adjustment settings based on varying light conditions at area 122 or based on a time of day.

FIG. 1 includes stages A through C, which represent a flow of data. In stage (A), the video recorder 120 obtains video data 125 of an example area 122 or location at property 102. The video data 125 can include images of person 108, window treatment 126, and window 128. The control unit 110 located at the property 102 receives or collects the video data 125 and sends the video data 125 to the remote monitoring server 160. The video data 125 can be a combination of videos, still images, and other sensor data 125 that include visual information about a location of person 108, window treatment 126, or window 128. The data 125 can also include visual information about attributes of light 130. In some implementations, sun 132 causes light 130 to enter the area 122 via window 128. In other implementations, light 130 may be caused by some other light source located at or near property 102.

In general, the sensor data 125 can include data collected by the one or more video recorders 120, data related to the controller 124, data generated by the control unit 110, or other monitoring system data. For example, the control unit 110 may send data 125 that includes video or still images captured by cameras at the property 102, motion sensing data, data related to energy usage, system settings (e.g., a light setting), audio data, or any other monitoring system data. In some cases, the sensor/video data 125 is processed by the control unit 110 before being sent to the monitoring server 160 (e.g., filtered or down-sampled image data 125, annotated data 125, transformed data 125, etc.).

In stage (B), the control unit 110 sends sensor data 125 to the monitoring server 160 for analysis and determination of an adjustment action. The control unit 110 may send video/sensor data 125 that includes parameter values for individual pixels. The values of the pixels can be analyzed and processed at the monitoring server 160 to determine an intensity or brightness attribute of light 130 or a glare attribute that results from light 130 interacting with items in the area 122. The pixel values indicate how pixels in the video data 125 are affected by light 130 at the property 102. Hence, the pixel values can be analyzed to determine various light conditions at area 122 of the property 102. The monitoring server 160 analyzes the video and sensor signal data 125 received from the control unit 110 to detect light conditions at the property 102 and to determine an adjustment setting for the window treatment 126 based on the detected light condition.

Areas 122 at property 102 can undergo a change in luminance during the course of the day as light 130 (e.g., sunlight) enters the area 122 at different angles (e.g., based on the time of day). This luminance can represent a light condition at the area 122. In some cases, the change in luminance causes an intensity, brightness, or glare associated with light 130 that adversely affects person 108. For example, a light condition at area 122 can result in glare at a screen of television (TV) or computer monitor that degrades a person's ability to distinguish items displayed on the screen or monitor. In some examples, the monitoring server 160 analyzes the sensor data 125 to determine the location of an item (e.g., a television) at the area 122, a person 108 at the area 122, and the light condition at the area 122.

The monitoring server 160 determines an adjustment action at least based on the light condition at area 122 and the location of the person 108. The adjustment action is used to adjust the window treatment 126. For example, as discussed in more detail below with reference to FIG. 3, the adjustment action can adjust the position of a shade or blind at window 128 to reduce an amount of brightness or glare that may be affecting person 108. Alternatively, the adjustment action can adjust the position of a shade or blind at window 128 to increase the brightness at area 122 or to increase an amount of natural light entering area 122.

In stage (C), based on the data analysis in stage (B), the control unit 110 provides a command to controller 124 to cause the controller 124 to perform an adjustment action. For example, the adjustment action can adjust the window treatment 126 at window 128 to reduce an amount of light 130 entering area 122 or to increase an amount of light 130 entering area 122. The control unit 110 communicates with monitoring server 160 to determine or obtain an adjustment setting for adjusting the window treatment 126. The control unit 110 can communicate electronically with the monitoring server 160 through a wireless network, such as a cellular telephony or data network, through any of various communication protocols (e.g., GSM, LTE, CDMA, 3G, 4G, 5G, 802.11 family, etc.).

The monitoring server 160 can send the command to control unit 110 to perform an adjustment operation or can send the command directly to the controller 124 to perform the adjustment operation. In some implementations, the monitoring server 160 uses the control unit 110 to provide commands to video recorder 120 to adjust recording settings of the video recorder 120 or to adjusting viewing angles of the video recorder 120. For example, the server 160 may command video recorder 120 (e.g., a camera) to begin recording or command a light to turn on or off based on light conditions at the property 102. In other implementations, the monitoring server 160 sends one or more commands to controller 124 to cause adjustment of the window treatment 126 in response to user input received at authorized user mobile device 140.

Though the stages are described above in order of (A) through (C), it is to be understood that other sequencings are possible and disclosed by the present description. For example, in some implementations, the monitoring server 160 may receive sensor/video data 125 from the control unit 110 that includes window treatment 126 current position information, sensor status information, location information for each of video recorder 120, or combinations of each. In some cases, aspects of one or more stages may be omitted. For example, in some implementations, the monitoring server 160 may receive and/or analyze sensor data 125 that includes only location information for rather than both sensor status data and location data.

Figure 2:
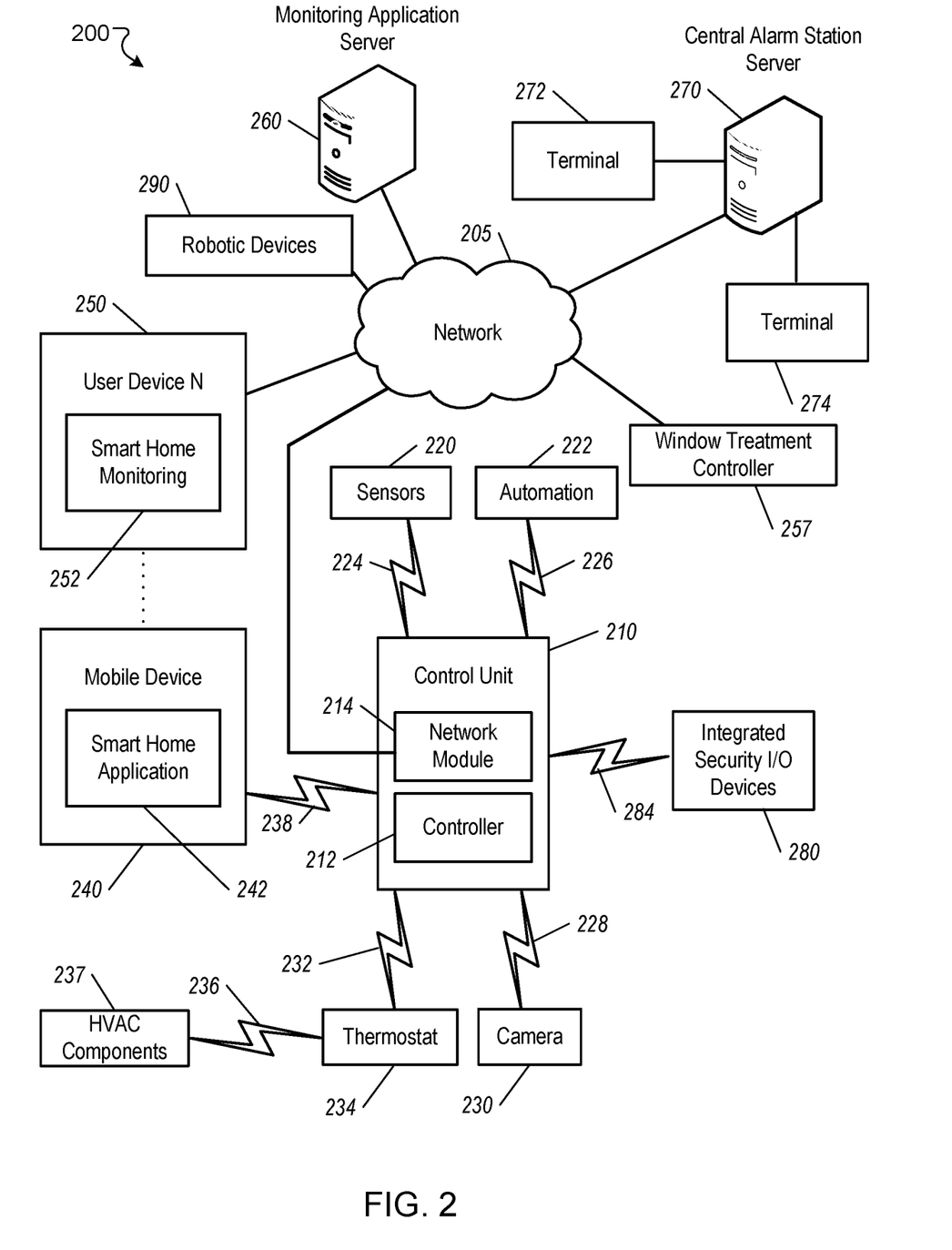
FIG. 2 shows a diagram illustrating an example property monitoring system that controls window treatment at a property.

FIG. 2 shows a diagram illustrating an example of a property monitoring system 200. The electronic system 200 includes a network 205, a control unit 210, one or more user devices 240 and 250, a monitoring server 260, and a central alarm station server 270. In some examples, the network 205 facilitates communications between the control unit 210, the one or more user devices 240 and 250, the monitoring server 260, and the central alarm station server 270.

The network 205 is configured to enable exchange of electronic communications between devices connected to the network 205. For example, the network 205 may be configured to enable exchange of electronic communications between the control unit 210, the one or more user devices 240 and 250, the monitoring server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television (TV), cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The control unit 210 includes a controller 212 and a network module 214. The controller 212 is configured to control a control unit monitoring system (e.g., a control unit system) that includes the control unit 210. In some examples, the controller 212 may include a processor or other control circuitry configured to execute instructions of a program that controls operation of a control unit system. In these examples, the controller 212 may be configured to receive input from sensors, flow meters, or other devices included in the control unit system and control operations of devices included in the household (e.g., speakers, lights, doors, etc.). For example, the controller 212 may be configured to control operation of the network module 214 included in the control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the control unit 210 to communicate over a local area network and/or the Internet. The network module 214 also may be a voice band modem configured to enable the alarm panel to communicate over the telephone lines of Plain Old Telephone Systems (POTS).

The control unit system that includes the control unit 210 includes one or more sensors. For example, the monitoring system may include multiple sensors 220. The sensors 220 may include a lock sensor, a contact sensor, a motion sensor, or any other type of sensor included in a control unit system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 220 can also include a radio-frequency identification (RFID) sensor that identifies a particular article that includes a pre-assigned RFID tag.

The control unit 210 communicates with the home automation controls 222 and a camera 230 to perform monitoring. The home automation controls 222 are connected to one or more devices that enable automation of actions in the home. For instance, the home automation controls 222 may be connected to one or more lighting systems and may be configured to control operation of the one or more lighting systems. Also, the home automation controls 222 may be connected to one or more electronic locks at the home and may be configured to control operation of the one or more electronic locks (e.g., control Z-Wave locks using wireless communications in the Z-Wave protocol). Further, the home automation controls 222 may be connected to one or more appliances at the home and may be configured to control operation of the one or more appliances. The home automation controls 222 may include multiple modules that are each specific to the type of device being controlled in an automated manner. The home automation controls 222 may control the one or more devices based on commands received from the control unit 210. For instance, the home automation controls 222 may cause a lighting system to illuminate an area to provide a better image of the area when captured by a camera 230.

The camera 230 may be a video/photographic camera or other type of optical sensing device configured to capture images. For instance, the camera 230 may be configured to capture images of an area within a building or home monitored by the control unit 210. The camera 230 may be configured to capture single, static images of the area and also video images of the area in which multiple images of the area are captured at a relatively high frequency (e.g., thirty images per second). The camera 230 may be controlled based on commands received from the control unit 210.

The camera 230 may be triggered by several different types of techniques. For instance, a Passive Infra-Red (PIR) motion sensor may be built into the camera 230 and used to trigger the camera 230 to capture one or more images when motion is detected. The camera 230 also may include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a command to capture an image when external devices detect motion or another potential alarm event. The camera 230 may receive the command from the controller 212 or directly from one of the sensors 220.

In some examples, the camera 230 triggers integrated or external illuminators (e.g., Infra-Red, Z-Wave controlled "white" lights, lights controlled by the home automation controls 222, etc.) to improve image quality when the scene is dark. An integrated or separate light sensor may be used to determine if illumination is desired and may result in increased image quality.

The camera 230 may be programmed with any combination of time/day schedules, system "arming state", or other variables to determine whether images should be captured or not when triggers occur. The camera 230 may enter a low-power mode when not capturing images. In this case, the camera 230 may wake periodically to check for inbound messages from the controller 212. The camera 230 may be powered by internal, replaceable batteries if located remotely from the control unit 210. The camera 230 may employ a small solar cell to recharge the battery when light is available. Alternatively, the camera 230 may be powered by the controller's 212 power supply if the camera 230 is co-located with the controller 212.

In some implementations, the camera 230 communicates directly with the monitoring server 260 over the Internet. In these implementations, image data captured by the camera 230 does not pass through the control unit 210 and the camera 230 receives commands related to operation from the monitoring server 260.

The system 200 also includes thermostat 234 to perform dynamic environmental control at the home. The thermostat 234 is configured to monitor temperature and/or energy consumption of an HVAC system associated with the thermostat 234, and is further configured to provide control of environmental (e.g., temperature) settings. In some implementations, the thermostat 234 can additionally or alternatively receive data relating to activity at a home and/or environmental data at a home, e.g., at various locations indoors and outdoors at the home. The thermostat 234 can directly measure energy consumption of the HVAC system associated with the thermostat, or can estimate energy consumption of the HVAC system associated with the thermostat 234, for example, based on detected usage of one or more components of the HVAC system associated with the thermostat 234. The thermostat 234 can communicate temperature and/or energy monitoring information to or from the control unit 210 and can control the environmental (e.g., temperature) settings based on commands received from the control unit 210.

In some implementations, the thermostat 234 is a dynamically programmable thermostat and can be integrated with the control unit 210. For example, the dynamically programmable thermostat 234 can include the control unit 210, e.g., as an internal component to the dynamically programmable thermostat 234. In addition, the control unit 210 can be a gateway device that communicates with the dynamically programmable thermostat 234. In some implementations, the thermostat 234 is controlled via one or more home automation controls 222.

A module 237 is connected to one or more components of an HVAC system associated with a home, and is configured to control operation of the one or more components of the HVAC system. In some implementations, the module 237 is also configured to monitor energy consumption of the HVAC system components, for example, by directly measuring the energy consumption of the HVAC system components or by estimating the energy usage of the one or more HVAC system components based on detecting usage of components of the HVAC system. The module 237 can communicate energy monitoring information and the state of the HVAC system components to the thermostat 234 and can control the one or more components of the HVAC system based on commands received from the thermostat 234.

The system 200 includes one or more window treatment controllers 257. Each of the one or more window treatment controller 257 connects to a window treatment of the home. The window treatment controllers 257 can be computing devices (e.g., a computer, microcontroller, FPGA, ASIC, or other device capable of electronic computation) capable of receiving data related to the window treatment and communicating electronically with the monitoring system control unit 210. The window treatment controller 257 can be integrated into the window treatment by the window treatment manufacturer, or can be connected by a third party. The window treatment controller 257 can be located on a stationary or movable component of the window treatment.

In some implementations, electric power to the window treatment is routed through the window treatment controller 257 such that the window treatment controller 257 can connect or disconnect power to the window treatment, e.g., by setting a switch.

The window treatment controller 257 receives data from one or more the monitoring server or one or more window treatment sensors at the property. The window treatment sensors can include, for example, sensors that detect a location of a section of the window treatment (e.g., at the base of the window, partway up the window, at the top of the window, or at a certain angle relative to the window). The window treatment sensors can also include force, pressure, or other sensors on the window treatment that detect position and movement attributes of the window treatment. In some examples, the window treatment sensors can indicate motion of the window treatment (whether it is in motion, its speed, movement angle or tilt, and other motion parameters).

The window treatment controller 257 can receive data from the one or more window treatment sensors through any combination of wired and/or wireless data links. For example, the window treatment controller 257 can receive sensor data via a Bluetooth, Bluetooth LE, Z-Wave, or ZigBee data link.

The window treatment controller 257 communicates electronically with the control unit 210. For example, the window treatment controller 257 can send data related to the window treatment to the control unit 210 and receive commands related to window treatment operation. In some examples, the window treatment controller 257 processes or generates window treatment data describing a position of the window treatment prior to sending it to the control unit 210.

In some examples, the system 200 further includes one or more robotic devices 290. The robotic devices 290 may be any type of robots that are capable of moving and taking actions that assist in home monitoring. For example, the robotic devices 290 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 290 may be devices that are intended for other purposes and merely associated with the system 200 for use in appropriate circumstances. For instance, a robotic vacuum cleaner device may be associated with the monitoring system 200 as one of the robotic devices 290 and may be controlled to take action responsive to monitoring system events.

In some examples, the robotic devices 290 automatically navigate within a home. In these examples, the robotic devices 290 include sensors and control processors that guide movement of the robotic devices 290 within the home. For instance, the robotic devices 290 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 290 may include control processors that process output from the various sensors and control the robotic devices 290 to move along a path that reaches the desired destination and avoids obstacles. In this regard, the control processors detect walls or other obstacles in the home and guide movement of the robotic devices 290 in a manner that avoids the walls and other obstacles.

In addition, the robotic devices 290 may store data that describes attributes of the home. For instance, the robotic devices 290 may store a floorplan and/or a three-dimensional model of the home that enables the robotic devices 290 to navigate the home. During initial configuration, the robotic devices 290 may receive the data describing attributes of the home, determine a frame of reference to the data (e.g., a home or reference location in the home), and navigate the home based on the frame of reference and the data describing attributes of the home. Further, initial configuration of the robotic devices 290 also may include learning of one or more navigation patterns in which a user provides input to control the robotic devices 290 to perform a specific navigation action (e.g., fly to an upstairs bedroom and spin around while capturing video and then return to a home charging base). In this regard, the robotic devices 290 may learn and store the navigation patterns such that the robotic devices 290 may automatically repeat the specific navigation actions upon a later request.

In some examples, the robotic devices 290 may include data capture and recording devices. In these examples, the robotic devices 290 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 290 to take and store a biometric sample that can be used to identify the person (e.g., a biometric sample with DNA that can be used for DNA testing).

In some implementations, the robotic devices 290 may include output devices. In these implementations, the robotic devices 290 may include one or more displays, one or more speakers, and/or any type of output devices that allow the robotic devices 290 to communicate information to a nearby user.

The robotic devices 290 also may include a communication module that enables the robotic devices 290 to communicate with the control unit 210, each other, and/or other devices. The communication module may be a wireless communication module that allows the robotic devices 290 to communicate wirelessly. For instance, the communication module may be a Wi-Fi module that enables the robotic devices 290 to communicate over a local wireless network at the home. The communication module further may be a 900 MHz wireless communication module that enables the robotic devices 290 to communicate directly with the control unit 210. Other types of short-range wireless communication protocols, such as Bluetooth, Bluetooth LE, Z-Wave, ZigBee, etc., may be used to allow the robotic devices 290 to communicate with other devices in the home. In some implementations, the robotic devices 290 may communicate with each other or with other devices of the system 200 through the network 205.

The robotic devices 290 further may include processor and storage capabilities. The robotic devices 290 may include any suitable processing devices that enable the robotic devices 290 to operate applications and perform the actions described throughout this disclosure. In addition, the robotic devices 290 may include solid state electronic storage that enables the robotic devices 290 to store applications, configuration data, collected sensor data, and/or any other type of information available to the robotic devices 290.

The robotic devices 290 are associated with one or more charging stations. The charging stations may be located at predefined home base or reference locations in the home. The robotic devices 290 may be configured to navigate to the charging stations after completion of tasks needed to be performed for the monitoring system 200. For instance, after completion of a monitoring operation or upon instruction by the control unit 210, the robotic devices 290 may be configured to automatically fly to and land on one of the charging stations. In this regard, the robotic devices 290 may automatically maintain a fully charged battery in a state in which the robotic devices 290 are ready for use by the monitoring system 200.

The charging stations may be contact based charging stations and/or wireless charging stations. For contact based charging stations, the robotic devices 290 may have readily accessible points of contact that the robotic devices 290 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 290 may charge through a wireless exchange of power. In these cases, the robotic devices 290 need only locate themselves closely enough to the wireless charging stations for the wireless exchange of power to occur. In this regard, the positioning needed to land at a predefined home base or reference location in the home may be less precise than with a contact based charging station. Based on the robotic devices 290 landing at a wireless charging station, the wireless charging station outputs a wireless signal that the robotic devices 290 receive and convert to a power signal that charges a battery maintained on the robotic devices 290.

In some implementations, each of the robotic devices 290 has a corresponding and assigned charging station such that the number of robotic devices 290 equals the number of charging stations. In these implementations, the robotic devices 290 always navigate to the specific charging station assigned to that robotic device. For instance, a first robotic device may always use a first charging station and a second robotic device may always use a second charging station.

In some examples, the robotic devices 290 may share charging stations. For instance, the robotic devices 290 may use one or more community charging stations that are capable of charging multiple robotic devices 290. The community charging station may be configured to charge multiple robotic devices 290 in parallel. The community charging station may be configured to charge multiple robotic devices 290 in serial such that the multiple robotic devices 290 take turns charging and, when fully charged, return to a predefined home base or reference location in the home that is not associated with a charger. The number of community charging stations may be less than the number of robotic devices 290.

Also, the charging stations may not be assigned to specific robotic devices 290 and may be capable of charging any of the robotic devices 290. In this regard, the robotic devices 290 may use any suitable, unoccupied charging station when not in use. For instance, when one of the robotic devices 290 has completed an operation or is in need of battery charge, the control unit 210 references a stored table of the occupancy status of each charging station and instructs the robotic device to navigate to the nearest charging station that is unoccupied.

The system 200 further includes one or more integrated security devices 280. The one or more integrated security devices may include any type of device used to provide alerts based on received sensor data. For instance, the one or more control units 210 may provide one or more alerts to the one or more integrated security input/output devices 280. Additionally, the one or more control units 210 may receive one or more sensor data from the sensors 220 and determine whether to provide an alert to the one or more integrated security input/output devices 280.

The sensors 220, the home automation controls 222, the camera 230, the thermostat 234, and the integrated security devices 280 may communicate with the controller 212 over communication links 224, 226, 228, 232, 238, and 284. The communication links 224, 226, 228, 232, 238, and 284 may be a wired or wireless data pathway configured to transmit signals from the sensors 220, the home automation controls 222, the camera 230, the thermostat 234, and the integrated security devices 280 to the controller 212. The sensors 220, the home automation controls 222, the camera 230, the thermostat 234, and the integrated security devices 280 may continuously transmit sensed values to the controller 212, periodically transmit sensed values to the controller 212, or transmit sensed values to the controller 212 in response to a change in a sensed value.

The communication links 224, 226, 228, 232, 238, and 284 may include a local network. The sensors 220, the home automation controls 222, the camera 230, the thermostat 234, and the integrated security devices 280, and the controller 212 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 260 is an electronic device configured to provide monitoring services by exchanging electronic communications with the control unit 210, the one or more user devices 240 and 250, and the central alarm station server 270 over the network 205. For example, the monitoring server 260 may be configured to monitor events (e.g., alarm events) generated by the control unit 210. In this example, the monitoring server 260 may exchange electronic communications with the network module 214 included in the control unit 210 to receive information regarding events (e.g., alerts) detected by the control unit 210. The monitoring server 260 also may receive information regarding events (e.g., alerts) from the one or more user devices 240 and 250.

In some examples, the monitoring server 260 may route alert data received from the network module 214 or the one or more user devices 240 and 250 to the central alarm station server 270. For example, the monitoring server 260 may transmit the alert data to the central alarm station server 270 over the network 205.

The monitoring server 260 may store sensor and image data received from the monitoring system and perform analysis of sensor and image data received from the monitoring system. Based on the analysis, the monitoring server 260 may communicate with and control aspects of the control unit 210 or the one or more user devices 240 and 250.

The monitoring server 260 may provide various monitoring services to the system 200. For example, the monitoring server 260 may analyze the sensor, image, and other data to determine an activity pattern of a resident of the home monitored by the system 200. In some implementations, the monitoring server 260 may analyze the data for alarm conditions or may determine and perform actions at the home by issuing commands to one or more of the controls 222, possibly through the control unit 210.

The central alarm station server 270 is an electronic device configured to provide alarm monitoring service by exchanging communications with the control unit 210, the one or more mobile devices 240 and 250, and the monitoring server 260 over the network 205. For example, the central alarm station server 270 may be configured to monitor alerting events generated by the control unit 210. In this example, the central alarm station server 270 may exchange communications with the network module 214 included in the control unit 210 to receive information regarding alerting events detected by the control unit 210. The central alarm station server 270 also may receive information regarding alerting events from the one or more mobile devices 240 and 250 and/or the monitoring server 260.

The central alarm station server 270 is connected to multiple terminals 272 and 274. The terminals 272 and 274 may be used by operators to process alerting events. For example, the central alarm station server 270 may route alerting data to the terminals 272 and 274 to enable an operator to process the alerting data. The terminals 272 and 274 may include general-purpose computers (e.g., desktop personal computers, workstations, or laptop computers) that are configured to receive alerting data from a server in the central alarm station server 270 and render a display of information based on the alerting data. For instance, the controller 212 may control the network module 214 to transmit, to the central alarm station server 270, alerting data indicating that a sensor 220 detected motion from a motion sensor via the sensors 220. The central alarm station server 270 may receive the alerting data and route the alerting data to the terminal 272 for processing by an operator associated with the terminal 272. The terminal 272 may render a display to the operator that includes information associated with the alerting event (e.g., the lock sensor data, the motion sensor data, the contact sensor data, etc.) and the operator may handle the alerting event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

The one or more authorized user devices 240 and 250 are devices that host and display user interfaces. For instance, the user device 240 is a mobile device that hosts or runs one or more native applications (e.g., the smart home application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a smart home application 242. The smart home application 242 refers to a software/firmware program running on the corresponding mobile device that enables the user interface and features described throughout. The user device 240 may load or install the smart home application 242 based on data received over a network or data received from local media. The smart home application 242 runs on mobile devices platforms, such as iPhone, iPod touch, Blackberry, Google Android, Windows Mobile, etc. The smart home application 242 enables the user device 240 to receive and process image and sensor data from the monitoring system.

The user device 250 may be a general-purpose computer (e.g., a desktop personal computer, a workstation, or a laptop computer) that is configured to communicate with the monitoring server 260 and/or the control unit 210 over the network 205. The user device 250 may be configured to display a smart home user interface 252 that is generated by the user device 250 or generated by the monitoring server 260. For example, the user device 250 may be configured to display a user interface (e.g., a web page) provided by the monitoring server 260 that enables a user to perceive images captured by the camera 230 and/or reports related to the monitoring system. Although FIG. 2 illustrates two user devices for brevity, actual implementations may include more (and, perhaps, many more) or fewer user devices.

In some implementations, the one or more user devices 240 and 250 communicate with and receive monitoring system data from the control unit 210 using the communication link 238. For instance, the one or more user devices 240 and 250 may communicate with the control unit 210 using various local wireless protocols such as Wi-Fi, Bluetooth, Z-Wave, ZigBee, HomePlug (Ethernet over power line), or wired protocols such as Ethernet and USB, to connect the one or more user devices 240 and 250 to local security and automation equipment. The one or more user devices 240 and 250 may connect locally to the monitoring system and its sensors and other devices. The local connection may improve the speed of status and control communications because communicating through the network 205 with a remote server (e.g., the monitoring server 260) may be significantly slower.

Although the one or more user devices 240 and 250 are shown as communicating with the control unit 210, the one or more user devices 240 and 250 may communicate directly with the sensors and other devices controlled by the control unit 210. In some implementations, the one or more user devices 240 and 250 replace the control unit 210 and perform the functions of the control unit 210 for local monitoring and long range/offsite communication.

In other implementations, the one or more user devices 240 and 250 receive monitoring system data captured by the control unit 210 through the network 205. The one or more user devices 240, 250 may receive the data from the control unit 210 through the network 205 or the monitoring server 260 may relay data received from the control unit 210 to the one or more user devices 240 and 250 through the network 205. In this regard, the monitoring server 260 may facilitate communication between the one or more user devices 240 and 250 and the monitoring system.

In some implementations, the one or more user devices 240 and 250 may be configured to switch whether the one or more user devices 240 and 250 communicate with the control unit 210 directly (e.g., through link 238) or through the monitoring server 260 (e.g., through network 205) based on a location of the one or more user devices 240 and 250. For instance, when the one or more user devices 240 and 250 are located close to the control unit 210 and in range to communicate directly with the control unit 210, the one or more user devices 240 and 250 use direct communication. When the one or more user devices 240 and 250 are located far from the control unit 210 and not in range to communicate directly with the control unit 210, the one or more user devices 240 and 250 use communication through the monitoring server 260.

Although the one or more user devices 240 and 250 are shown as being connected to the network 205, in some implementations, the one or more user devices 240 and 250 are not connected to the network 205. In these implementations, the one or more user devices 240 and 250 communicate directly with one or more of the monitoring system components and no network (e.g., Internet) connection or reliance on remote servers is needed.

In some implementations, the one or more user devices 240 and 250 are used in conjunction with only local sensors and/or local devices in a house. In these implementations, the system 200 includes the one or more user devices 240 and 250, the sensors 220, the home automation controls 222, the camera 230, the robotic devices 290, and the window treatment controller 257. The one or more user devices 240 and 250 receive data directly from the sensors 220, the home automation controls 222, the camera 230, the robotic devices 290, and the window treatment controller 257 and sends data directly to the sensors 220, the home automation controls 222, the camera 230, the robotic devices 290, and the window treatment controller 257. The one or more user devices 240, 250 provide the appropriate interfaces/processing to provide visual surveillance and reporting.

In other implementations, the system 200 further includes network 205 and the sensors 220, the home automation controls 222, the camera 230, the thermostat 234, the robotic devices 290, and the window treatment controller 257 are configured to communicate sensor and image data to the one or more user devices 240 and 250 over network 205 (e.g., the Internet, cellular network, etc.). In yet another implementation, the sensors 220, the home automation controls 222, the camera 230, the thermostat 234, the robotic devices 290, and the window treatment controller 257 (or a component, such as a bridge/router) are intelligent enough to change the communication pathway from a direct local pathway when the one or more user devices 240 and 250 are in close physical proximity to the sensors 220, the home automation controls 222, the camera 230, the thermostat 234, the robotic devices 290, and the window treatment controller 257 to a pathway over network 205 when the one or more user devices 240 and 250 are farther from the sensors 220, the home automation controls 222, the camera 230, the thermostat 234, the robotic devices 290, and the window treatment module.

In some examples, the system leverages GPS information from the one or more user devices 240 and 250 to determine whether the one or more user devices 240 and 250 are close enough to the sensors 220, the home automation controls 222, the camera 230, the thermostat 234, the robotic devices 290, and the window treatment controller 257 to use the direct local pathway or whether the one or more user devices 240 and 250 are far enough from the sensors 220, the home automation controls 222, the camera 230, the thermostat 234, the robotic devices 290, and the window treatment controller 257 that the pathway over network 205 is required.

In other examples, the system leverages status communications (e.g., pinging) between the one or more user devices 240 and 250 and the sensors 220, the home automation controls 222, the camera 230, the thermostat 234, the robotic devices 290, and the window treatment controller 257 to determine whether communication using the direct local pathway is possible. If communication using the direct local pathway is possible, the one or more user devices 240 and 250 communicate with the sensors 220, the home automation controls 222, the camera 230, the thermostat 234, the robotic devices 290, and the window treatment controller 257 using the direct local pathway. If communication using the direct local pathway is not possible, the one or more user devices 240 and 250 communicate with the sensors 220, the home automation controls 222, the camera 230, the thermostat 234, the robotic devices 290, and the window treatment controller 257 using the pathway over network 205.

In some implementations, the system 200 provides end users with access to images captured by the camera 230 to aid in decision making. The system 200 may transmit the images captured by the camera 230 over a wireless WAN network to the user devices 240 and 250. Because transmission over a wireless WAN network may be relatively expensive, the system 200 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 230). In these implementations, the camera 230 may be set to capture images on a periodic basis when the alarm system is armed in an "away" state, but set not to capture images when the alarm system is armed in a "home" state or disarmed. In addition, the camera 230 may be triggered to begin capturing images when the alarm system detects an event, such as an alarm event, a door-opening event for a door that leads to an area within a field of view of the camera 230, or motion in the area within the field of view of the camera 230. In other implementations, the camera 230 may capture images continuously, but the captured images may be stored or transmitted over a network when needed.

Figure 3:
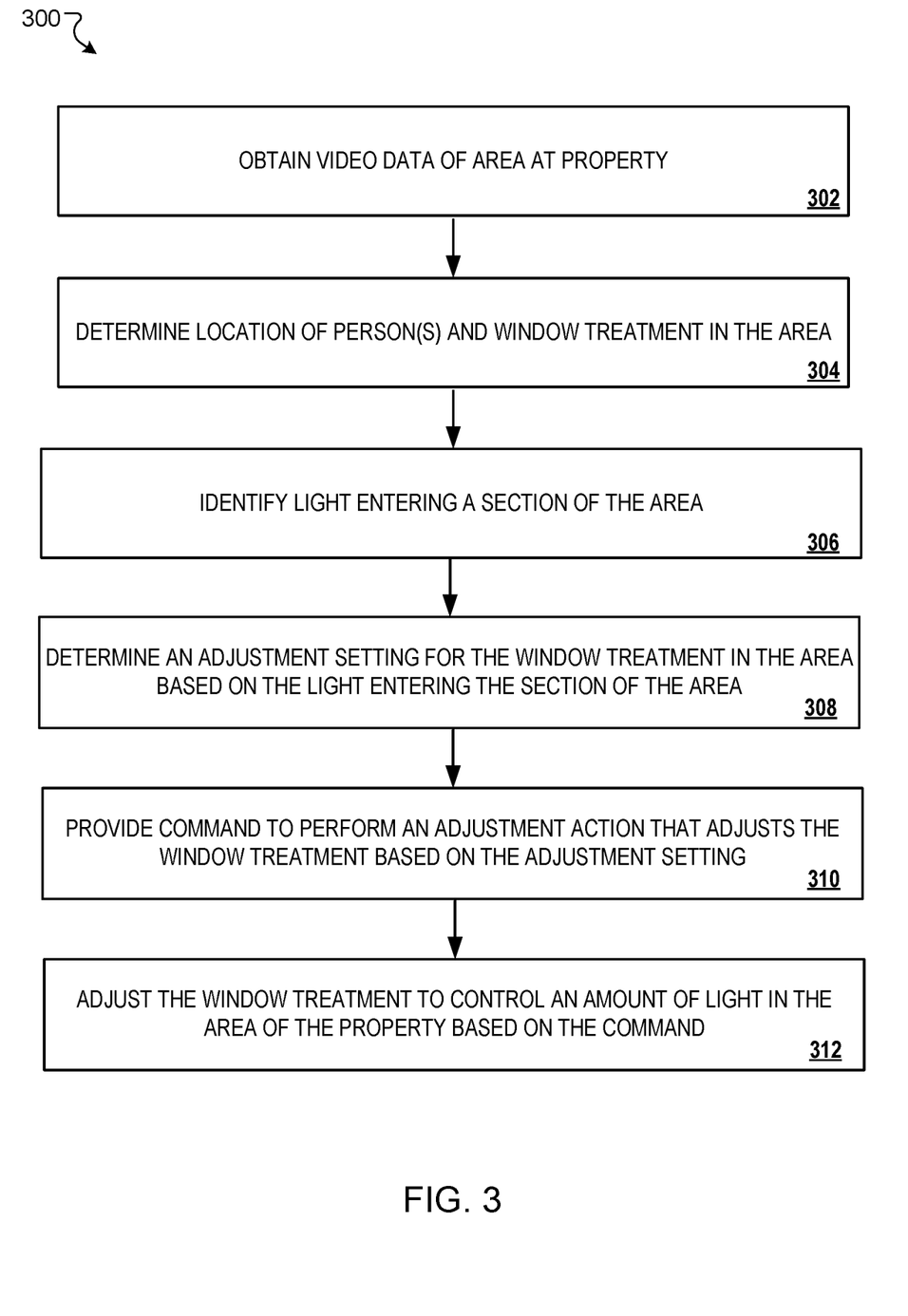
FIG. 3 shows an example process for controlling window treatment at a property.

FIG. 3 shows an example process 300 for controlling window treatment at the property 102. Process 300 can be implemented or performed using the systems described in this document. Descriptions of process 300 may reference one or more of the above-mentioned computing resources of systems 100 and 200. In some implementations, steps of process 300 are enabled by programmed instructions that are executable by processing devices of the systems described in this document.

Referring now to process 300, system 100 obtains video data 125 from a video recording device 120 at a property (302). The monitoring server 160 uses the video data 125 to determine a location of a person 108 at the property 102 and to determine a location of an electronic window treatment 126 at the property (304). As discussed below, in some implementations, the monitoring server 160 uses example image or item recognition software to identify persons or items at area 122. The monitoring server 160 can use data identifying the persons and items to determine the location of person 108, the window treatment 126, and the window 128. In some implementations, the monitoring server 160 analyzes the video data 125 against parameters of the data model 164 to determine the location of person 108, window treatment 126, and window 128.

The monitoring server 160 uses the video data 125 to identify an attribute of light 130 entering a section of area 122, e.g., via window 128 at the property (306). The attribute of light 130 indicates a light condition at area 122. In some implementations, identifying the attribute of the light 130 includes determining an intensity value of the attribute of the light 130 entering the window 128 at the property 102 and determining a glare value of the attribute of the light 130 entering the window at the property 102. Each of the intensity value and the glare value can be determined based on analysis of pixel data that includes pixel values indicating color and brightness of pixels included in the video data 125.

The pixel values indicate how pixels in the video data 125 are affected by light 130 at the property 102. The pixel values can be analyzed to determine various light conditions at area 122 of the property 102. Hence, the monitoring server 160 can analyze pixel values to determine an intensity or brightness attribute of light 130 or a glare attribute that results from light 130 interacting with items in the area 122. In some implementations, the monitoring server 160 uses image recognition or facial recognition software to analyzes the video data 125 with reference to the light conditions. For example, the monitoring server 160 can use the facial recognition software to detect and analyze facial features of person 108. In some implementations, facial expressions that demonstrate person 108 is squinting or blocking their eyes can indicate excessive brightness or glare at area 122. The excessive brightness or glare may be affecting the person's ability to view items at a display or TV screen at area 122.

The monitoring server 160 uses the video data 125 to determine an adjustment setting for the electronic window treatment 126 at the property (308). The monitoring server 160 determines the adjustment setting at least based on the light conditions at area 122 and the location of the person at area 122. In some implementations, the monitoring server 160 determines the adjustment setting at least based on a facial expression or facial feature of person 108. In other implementations, the monitoring server 160 determines the adjustment setting based on video data 125 that indicates another person is near window 128 or is approaching property 102. In this instance, the adjustment setting causes the controller 124 to adjust the window treatment 126 by, e.g., closing a blind or shade to provide additional privacy to the person.

Determining an adjustment setting can include: i) comparing the location of the person at the property 102 against the location of the window treatment 126 based on analysis of the video data 125 obtained from the recording device 120; and ii) determining the adjustment setting based on this comparison. This comparison can indicate that the person 108 is at a particularly close to window treatment 126 so that the person's vision may be adversely affected by bright sunlight from light 130 that is entering area 122. For example, the monitoring server 160 detects that person 108 is in a room at the property 102 and analyzes facial image data to determine that sunlight 130 is on, or being directed at, the person's eyes. The monitoring server 160 can use the data model 164 to determine whether there is a position (e.g., a more optimal position) for the window treatment 126 to reduce the amount of light 130 that may be affecting the person's eyes.

In response to determining that data model 164 indicates there is a position for the window treatment 126 that reduces an amount of sunlight in the person's eyes, the monitoring server 160 then uses the position information of the data model 164 to determine an adjustment setting. Based on the adjustment setting, the monitoring server 160 generates an instruction or command that is provided to the controller 124. Processing or executing the command by the controller 124 causes window treatment 126 to move or adjust to the position indicated at the data model 164. For example, the window treatment 126 can be adjusted to perform a relative move (e.g., move or rotate by 10%) or the window treatment 126 can be adjusted to perform a non-relative move (e.g., rotate to 45° position).

Determining an adjustment setting can also include: i) identifying a first section or area at the property 102 and a characteristic of the first area based on analysis of the video data 125; ii) determining that the window treatment 126 is located at a particular section of the first area at the property 102 based on analysis of the video data 125; and iii) determining the adjustment setting based on the characteristic of the first area and the window treatment 126 being located at the particular section of the first area. For example, person 108 can specify static areas (e.g., a bedroom or TV room) or sections of property 102 to shade from sunlight. A room or area 122 can have a programmed characteristic that causes the room to be identified as an office or living room that includes a television screen or a computer desk. Based on window treatment 126 being located in the room, the system can detect persons or items located in this room and shade their body, e.g., their upper body, or just their face, from sunlight 130 by adjusting window treatment 126.

For example, the monitoring server 160 detects that person 108 is in a room (e.g., a TV room) at the property 102 and analyzes item and facial image data to determine that the person is looking at a TV (or another item) in the room and/or that sunlight 130 is causing glare on a display screen of the TV or on another item in the room. In some implementations, the monitoring server 160 determines that the detected glare is affecting (e.g., adversely affecting) the person's ability to view programs or content on the display screen of TV or computer. Based on these determinations, the monitoring server 160 can use the data model 164 to determine whether there is a position (e.g., a more optimal position) for the window treatment 126 to reduce an amount of glare on the display or item.

In response to determining that data model 164 indicates there is a position for the window treatment 126 that reduces an amount of glare on an item in the room, the monitoring server 160 then uses the position information of the data model 164 to determine an adjustment setting. Based on the adjustment setting, the monitoring server 160 then generates a command and provides the command to the controller 124. The controller 124 uses the command to cause window treatment 126 to move or adjust to the position indicated at the data model 164 to reduce the amount of glare on the display or item in the room.

In some implementations, the monitoring server 160 is configured to detect movement of persons or items in a room and to determine adjustment settings for dynamically adjusting window treatment 126 as persons or items move about in the room. In other implementations, the monitoring server 160 detects that a particular item is located at area 122 and adjusts the window treatment 126 to achieve a light condition that is specific to the light needs of the particular item. For example, monitoring server 160 can analyze the video data 125 to detect or determine that a plant is near the window 128 and adjust the window treatment 126 to increase an amount of sunlight that is directed toward the plant.

The control unit 110 communicates with the monitoring server 160 to provide a command to perform one or more adjustment actions based on adjustment settings determined by the monitoring server (310). For example, a first adjustment action can be performed to adjust a position of the electronic window treatment 126 (e.g., to open shades or blinds) located at window 128. A second adjustment action can also be performed to re-adjust the window treatment 126, e.g., by closing shades, raising or lower curtains, or adjusting angles of blinds located at window 128. The controller 124 adjusts the electronic window treatment to control the amount of light in the area of the property based on the parameters of the received command that define or specify the adjustment action to be performed (312).

The monitoring server 160 can determine an adjustment setting and provide the command to perform the adjustment action in response to determining that an intensity value of the attribute of the light 130 exceeds a threshold intensity value. In this instance, the determined intensity value indicates that light 130 is excessively bright and the command is provided to controller 124 to perform an adjustment action that adjusts the window treatment 126 to reduce the brightness. Similarly, the monitoring server 160 can determine an adjustment setting in response to determining that a glare value of the attribute of the light 130 exceeds a threshold glare value. In this instance, the determined glare value indicates that light 130 is causing excessive glare and the command is provided to controller 124 to perform an adjustment action that adjusts the window treatment 126 to reduce the glare.

In other implementations, the adjustment settings are based on a predetermined schedule. For example, monitoring server 160 can be programmed so that window treatment 126 located in a particular room at the property 102 is adjusted to open in the morning to ensure a person awakes to sunlight from sun 132. The monitoring server 160 analyzes video data 125 to detect that a person has transitioned out of bed. In response to this detection, the monitoring server 160 determines an adjustment setting that can be used to command controller 124 to close (e.g., partially close) the window treatment 126. The adjustment setting is provided to controller 124 to perform an adjustment of window treatment 126 to provide additional privacy as a person moves or walks past window 128. In some implementations, monitoring server 160 is part of an intelligent system that processes video data (or other sensing modalities) to determine an adjustment setting that causes controller 124 to close or adjust shades in a bedroom in response to detecting that a person is sitting upright in a bed. In these and other implementations, video data 125 is automatically processed and formatted, e.g., at the monitoring server 160 or locally at a recording device, to remove or obscure identifying physical features of the person to maintain privacy of the person, e.g., during states of undress.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method implemented using a property monitoring system configured to monitor a property, the method comprising:
    determining a location of an electronic window treatment at the property based on video data obtained by a video recording device installed at the property, wherein the electronic window treatment includes a controller operable to adjust the electronic window treatment;
    detecting, from the video data, that light passing through a window at the property causes glare at a display of an electronic device in a room that is monitored by the video recording device;
    determining, from the video data, that the glare has an adverse effect on a person's ability to identify content rendered on the display of the electronic device at the property based on: i) a location of the person in the room, and ii) how the light interacts with the display of the electronic device;
    determining an adjustment setting for the electronic window treatment based at least on the adverse effect to the person and the location of the electronic window treatment at the property, wherein the adjustment setting controls an amount of light in an area of the room that includes the display; and
    providing, based on the adjustment setting, a command to perform a first adjustment action that adjusts a position of the electronic window treatment.

2. The method of claim 1, comprising:
    adjusting, based on the command, the electronic window treatment to control the amount of light in the area of the property.

3. The method of claim 1, comprising:
    determining an intensity value of an attribute of the light passing through the window at the property; and
    determining a glare value of the attribute of the light passing through the window at the property.

4. The method of claim 3, comprising:
    determining the adjustment setting for the electronic window treatment in response to determining that the intensity value of the attribute of the light exceeds a threshold intensity value.

5. The method of claim 3, comprising:
determining the adjustment setting for the electronic window treatment in response to determining that the glare value of the attribute of the light exceeds a threshold glare value.

6. The method of claim 1, wherein determining the adjustment setting comprises:
determining that the person is within a threshold distance of the window and the electronic window treatment; and
determining the adjustment setting when the person is within the threshold distance of the window or the electronic window treatment.

7. The method of claim 1, comprising:
determining that the person is within a threshold distance of the window such that an intensity of an attribute of light passing through the window affects the person's ability to identify an object at the property; and
adjusting the electronic window treatment to control the amount of light in the area of the property to reduce the intensity of the attribute of light passing through the window.

8. The method of claim 1, wherein determining the adjustment setting comprises:
identifying, based on the video data, a first area at the property and a characteristic of the first area;
determining that the electronic window treatment is located at a particular section of the first area at the property; and
determining the adjustment setting based on the characteristic of the first area and the electronic window treatment being located at the particular section of the first area.

9. The method of claim 1, comprising:
determining a plurality of light conditions at the property based on a visual data model of the area of the property; and
actuating, using wireless signals received by a transceiver of the controller, motorized controls of the controller to adjust the electronic window treatment and control the amount of light in the area of the property based the plurality of light conditions.

10. The method of claim 9, wherein determining the plurality of light conditions comprises:
monitoring imagery data of the visual data model;
detecting, from the visual data model, when patches of pixels in the imagery data increase and decrease in brightness throughout a given day in response to monitoring the imagery data; and
determining, from the visual data model, the plurality of light conditions based on the relative increase and decrease in the brightness of the patches of pixels in the imagery data.

11. The method of claim 1, wherein the property monitoring system includes a monitoring server and the method comprises:
generating, at the monitoring server, a visual data model based on inferences learned from observations about conditions at the property detected using imagery of the video data and sensor data obtained from sensors installed at the property; and
determining a plurality of light conditions at the property based on the visual data model, wherein the visual data model is descriptive of the area of the property as a result of ground planes inferred from the imagery and the sensor data obtained from the sensors.

12. The method of claim 11, wherein determining the adjustment setting comprises:
detecting, based on pixel values of the imagery, interactions between the light and items in the area of the property that includes the location of the person;
determining, based on the location of the person, that the interactions between the light and the items trigger changes in luminance that cause glare in the area of the property; and
determining the adjustment setting for the electronic window treatment in response to determining that the glare degrades an ability of the person to distinguish the items in the area of the property.

13. A property monitoring system configured to monitor a property, the property monitoring system comprising:
one or more processing devices; and
one or more non-transitory machine-readable storage devices storing instructions that are executable by the one or more processing devices to cause performance of operations comprising:
determining a location of an electronic window treatment at the property based on video data obtained by a video recording device installed at the property, wherein the electronic window treatment includes a controller operable to adjust the electronic window treatment;
detecting, from the video data, that light passing through a window at the property causes glare at a display of an electronic device in a room that is monitored by the video recording device;
determining, from the video data, that the glare has an adverse effect on a person's ability to identify content rendered on the display of the electronic device at the property based on: i) a location of the person in the room, and ii) how the light interacts with the display of the electronic device;
determining an adjustment setting for the electronic window treatment based at least on the adverse effect to the person and the location of the electronic window treatment at the property, wherein the adjustment setting controls an amount of light in an area of the room that includes the display; and
providing, based on the adjustment setting, a command to perform a first adjustment action that adjusts a position of the electronic window treatment.

14. The system of claim 13, wherein the operations comprise:
determining an intensity value of an attribute of the light passing through the window at the property; and
determining a glare value of the attribute of the light passing through the window at the property.

15. The system of claim 14, wherein the operations comprise:
determining the adjustment setting for the electronic window treatment in response to determining that the intensity value of the attribute of the light exceeds a threshold intensity value.

16. The system of claim 14, wherein the operations comprise:
determining the adjustment setting for the electronic window treatment in response to determining that the glare value of the attribute of the light exceeds a threshold glare value.

17. The system of claim 13, wherein determining the adjustment setting comprises:
- determining that the person is within a threshold distance of the window and the electronic window treatment; and
- determining the adjustment setting when the person is within the threshold distance of the window or the electronic window treatment.

18. The system of claim 13, wherein the operations comprise:
- determining that the person is within a threshold distance of the window such that an intensity of an attribute of light passing through the window affects the person's ability to identify an object at the property; and
- adjusting the electronic window treatment to control the amount of light in the area of the property to reduce the intensity of the attribute of light passing through the window.

19. The system of claim 13, wherein determining the adjustment setting comprises:
- identifying, based on the video data, a first area at the property and a characteristic of the first area;
- determining that the electronic window treatment is located at a particular section of the first area at the property; and
- determining the adjustment setting based on the characteristic of the first area and the electronic window treatment being located at the particular section of the first area.

20. One or more non-transitory machine-readable storage devices storing instructions that are executable by one or more processing devices to cause performance of operations comprising:
- determining a location of an electronic window treatment at the property based on video data obtained by a video recording device installed at the property, wherein the electronic window treatment includes a controller operable to adjust the electronic window treatment;
- detecting, from the video data, that light passing through a window at the property causes glare at a display of an electronic device in a room that is monitored by the video recording device;
- determining, from the video data, that the glare has an adverse effect on a person's ability to identify content rendered on the display of the electronic device at the property based on: i) a location of the person in the room, and ii) how the light interacts with the display of the electronic device;
- determining an adjustment setting for the electronic window treatment based at least on the adverse effect to the person and the location of the electronic window treatment at the property, wherein the adjustment setting controls an amount of light in an area of the room that includes the display; and
- providing, based on the adjustment setting, a command to perform a first adjustment action that adjusts a position of the electronic window treatment.

21. The system of claim 13, wherein the property monitoring system includes a monitoring server and the operations comprise:
- generating, at the monitoring server, a visual data model based on inferences learned from observations about conditions at the property detected using imagery of the video data and sensor data obtained from sensors installed at the property; and
- determining a plurality of light conditions at the property based on the visual data model, wherein the visual data model is descriptive of the area of the property as a result of ground planes inferred from the imagery and the sensor data obtained from the sensors.

* * * * *